US009227565B2

(12) United States Patent
Sura et al.

(10) Patent No.: US 9,227,565 B2
(45) Date of Patent: Jan. 5, 2016

(54) VEHICLE ILLUMINATION ASSEMBLY

(71) Applicant: Nissan North America, Inc., Franklin, TN (US)

(72) Inventors: Bhargav Sura, Sterling Heights, MI (US); Norbert Weinert, Troy, MI (US); Quan Cat, Canton, MI (US); Randall Johnson, White Lake, MI (US); Nelson Phan, Rochester Hills, MI (US)

(73) Assignee: Nissan North America, Inc., Franklin, TN (US)

( * ) Notice: Subject to any disclaimer, the term of this patent is extended or adjusted under 35 U.S.C. 154(b) by 228 days.

(21) Appl. No.: 14/017,135

(22) Filed: Sep. 3, 2013

(65) Prior Publication Data
US 2015/0062941 A1    Mar. 5, 2015

(51) Int. Cl.
  *B60Q 1/00*    (2006.01)
  *B60Q 3/02*    (2006.01)
  *H03K 17/00*   (2006.01)
  *B60Q 3/06*    (2006.01)

(52) U.S. Cl.
  CPC ............ *B60Q 3/0293* (2013.01); *B60Q 3/0296* (2013.01); *H03K 17/00* (2013.01); *B60Q 3/0216* (2013.01); *B60Q 3/06* (2013.01)

(58) Field of Classification Search
  CPC ...... B60Q 3/0293; B60Q 3/0296; B60Q 3/06; H03K 17/00
  USPC ........................................... 362/488, 84, 464
  See application file for complete search history.

(56) References Cited

U.S. PATENT DOCUMENTS

| 6,464,381 | B2 |   | 10/2002 | Anderson, Jr. et al. |
| 6,879,263 | B2 | * | 4/2005  | Pederson et al. ......... 340/815.45 |
| 7,221,271 | B2 | * | 5/2007  | Reime ........................... 340/541 |
| 7,361,860 | B2 |   | 4/2008  | Caldwell |
| 7,445,350 | B2 |   | 11/2008 | Konet et al. |
| 7,547,119 | B2 |   | 6/2009  | Kuwana et al. |
| 7,556,412 | B2 |   | 7/2009  | Guillermo |
| 7,663,607 | B2 |   | 2/2010  | Hotelling et al. |
| 7,677,774 | B2 | * | 3/2010  | Ando ............................ 362/488 |
| 8,029,052 | B2 |   | 10/2011 | Kadzban et al. |
| 8,188,878 | B2 | * | 5/2012  | Pederson et al. ......... 340/815.45 |
| 8,235,460 | B2 | * | 8/2012  | Plavetich et al. ............. 296/215 |
| 2002/0024713 | A1 | * | 2/2002 | Roberts et al. ................ 359/267 |
| 2004/0117084 | A1 |   | 6/2004 | Mercier et al. |
| 2006/0044800 | A1 | * | 3/2006 | Reime ........................... 362/276 |
| 2006/0082545 | A1 |   | 4/2006 | Choquet et al. |

(Continued)

OTHER PUBLICATIONS

Leviton Manufacturing Co., Inc.; Lighting Control Division; True Touch™ Decora Touch Dimmers; Product Specifications; 1999; Little Neck, New York.

*Primary Examiner* — Ali Alavi
(74) *Attorney, Agent, or Firm* — Global IP Counselors, LLP

(57) ABSTRACT

A vehicle interior illumination assembly includes a lighting fixture and a controller. The lighting fixture has a proximity detection layer and an illumination layer, with one of the proximity detection layer and the illumination layer overlaying the other of the proximity detection layer and the illumination layer. The controller is operably connected to the proximity detection layer and the illumination layer. The controller is configured to toggle the illumination layer on and off in response to detecting a first movement gesture at the proximity detection layer. The controller is configured to adjust a first prescribed lighting parameter of the light produced by the illumination layer in response to detecting a second movement gesture at the proximity detection layer.

20 Claims, 10 Drawing Sheets

(56) References Cited

U.S. PATENT DOCUMENTS

| | | | |
|---|---|---|---|
| 2006/0181893 A1* | 8/2006 | Fernandez et al. | 362/494 |
| 2007/0019426 A1* | 1/2007 | Uken | B60R 1/12 |
| | | | 362/494 |
| 2007/0041169 A1* | 2/2007 | Konet | B60Q 3/0283 |
| | | | 362/84 |
| 2008/0089079 A1* | 4/2008 | Gunnewig | B60Q 3/0253 |
| | | | 362/470 |
| 2009/0229955 A1* | 9/2009 | Hein et al. | 200/42.01 |
| 2010/0232171 A1 | 9/2010 | Cannon et al. | |
| 2010/0238677 A1* | 9/2010 | de Laine | B60Q 3/004 |
| | | | 362/520 |
| 2010/0271837 A1 | 10/2010 | Yamauchi et al. | |
| 2011/0002138 A1 | 1/2011 | Hayes et al. | |
| 2011/0222302 A1* | 9/2011 | Hodgson | B60Q 3/0203 |
| | | | 362/490 |
| 2012/0048708 A1 | 3/2012 | Salter et al. | |
| 2012/0133169 A1 | 5/2012 | George et al. | |
| 2012/0257416 A1* | 10/2012 | Demma | 362/613 |
| 2014/0265934 A1* | 9/2014 | Ramey | B60Q 3/0293 |
| | | | 315/307 |

* cited by examiner

VEHICLE ILLUMINATION ASSEMBLY

BACKGROUND

1. Field of the Invention

The present invention generally relates to a vehicle illumination assembly. More specifically, the present invention relates to a vehicle illumination assembly that includes a lighting fixture with an illumination layer and an overlaying proximity detection layer that are touch activated and controlled.

2. Background Information

Vehicles are typically provided with an interior light or interior lights that are controlled by mechanical switches.

SUMMARY

One object of the disclosure is to provide a vehicle having interior lighting not operated by mechanical switches.

Another object of the disclosure is to provide a vehicle with an interior lighting fixture that is touch controlled.

Another object of the disclosure is to provide a vehicle with an interior lighting fixture that includes multiple color and adjustable brightness settings.

In view of the state of the known technology, one aspect of the disclosure provides a vehicle interior illumination assembly that includes a lighting fixture having a proximity detection layer and an illumination layer. One of the proximity detection layer and the illumination layer overlays the other of the proximity detection layer and the illumination layer. A controller is operably connected to the proximity detection layer and the illumination layer. The controller is configured to toggle the illumination layer on and off in response to detecting a first movement gesture at the proximity detection layer. The controller is also configured to adjust a first prescribed lighting parameter of the light produced by the illumination layer in response to detecting a second movement gesture at the proximity detection layer.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
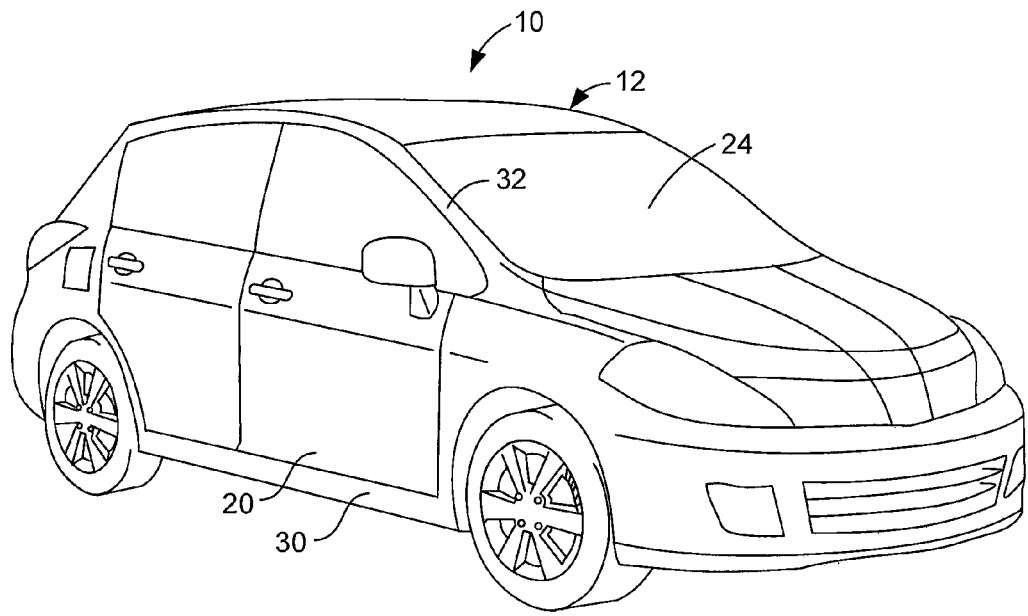
FIG. 1 is a perspective view of a vehicle having a passenger compartment with an illumination system that includes a plurality of lighting fixtures in accordance with a first embodiment.
Figure 2:
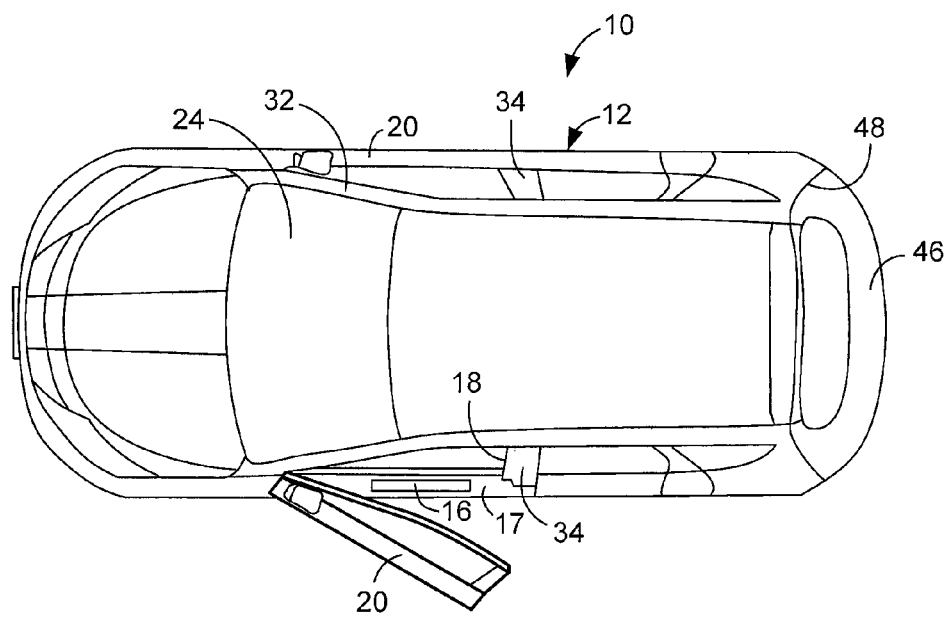
FIG. 2 is a top view of the vehicle with a closure panel in an open position exposing one of the plurality of lighting fixtures fixed to an upper surface of a sill structure of the vehicle in accordance with the first embodiment.

Referring initially to FIG. 1, a vehicle 10 that include a vehicle body structure 12 is illustrated in accordance with a first embodiment. As indicated in FIG. 2, the vehicle 10 is provided with an illumination assembly 14 that includes a plurality of light fixtures 16, with one of the light fixtures 16 being installed along, for example, a surface 17, where the surface 17 at least partially defines an opening 18 in the vehicle body structure 12. As is described below, there is a plurality of light fixtures 16 that define the illumination assembly 14, each lighting fixture 16 being installed at a different location.

As is described in greater detail below, each of plurality of lighting fixtures 16 of the illumination assembly 14 is configured to provide illumination, for example, when a door 20 that closes the opening 18, is moved from a closed position (FIG. 1) to an open position, (FIG. 2) or when one of the lighting fixtures 16 is touched. In the closed position, the door 20 covers the lighting fixture 16 installed to the surface 17 and in the open position, the door 20 exposes the lighting fixture 16 installed to the surface 17.

A brief description of the vehicle 10 is now provided with specific reference to FIGS. 1-4. The vehicle 10 includes, among other things, a passenger compartment 24 that is at least partially defined by elements of the vehicle body structure 12. Specifically, the vehicle body structure 12 includes a sill structure 30, an A-pillar structure 32, a B-pillar structure 34 and the door 20. The sill structure 30, the A-pillar structure 32 and the B-pillar structure 34 at least partially define the opening 18.

The door 20 is pivotally attached to the A-pillar structure 32 for movement between the closed position (FIG. 1) and the open position (FIG. 2), in a conventional manner. The door 20 is one example of a closure member of the vehicle 10 that moves between open and closed positions.

Figure 3:
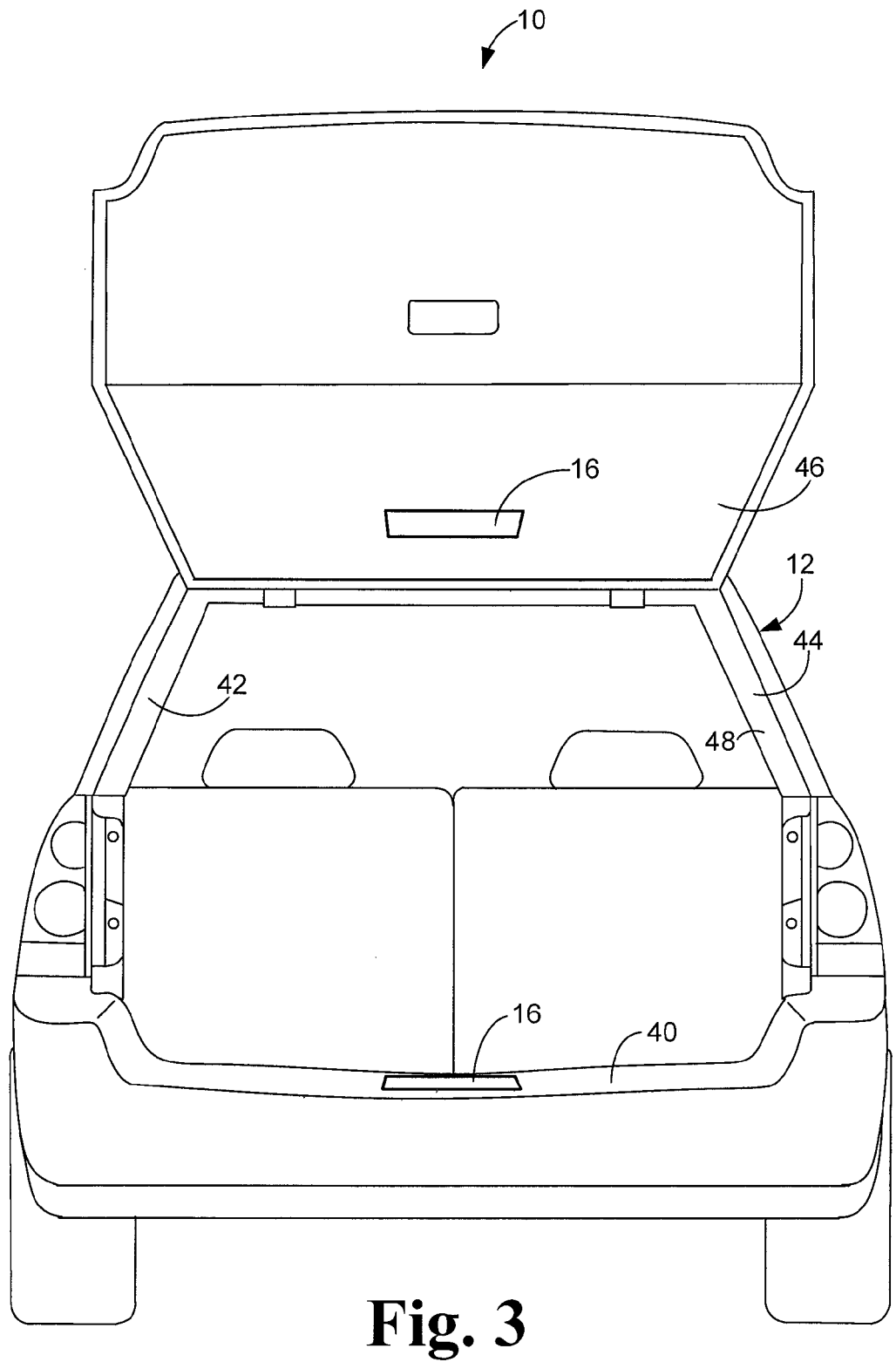
FIG. 3 is a rear view of the vehicle showing a rear hatch opening defined by a rear sill structure with first and second rear pillar structures, showing further examples of the plurality of lighting fixtures, with one lighting fixture on an upper surface of the rear sill structure and another lighting fixture on a rear hatch door in accordance with the first embodiment.

Further, as shown in FIG. 3, the vehicle body structure 12 includes a rear sill structure 40, a first rear pillar structure 42, a second rear pillar structure 44, and a rear hatch door 46. The rear sill structure 40, the first rear pillar structure 42 and the second rear pillar structure 44 define a rear hatch opening 48.

The sill structure 30 includes a plurality of members (not shown) that are welded or otherwise rigidly fixed to one another in a conventional manner. As shown in FIGS. 1 and 2, the sill structure 30 includes the surface 17 having a first edge extending along an exterior portion of the vehicle 10 and a second edge opposite the first edge extending along an interior portion of the passenger compartment 24 of the vehicle 10. As is clearly shown in FIGS. 1 and 2, the surface 17 at least partially defines the opening 18. The A-pillar structure 32 is similarly constructed from a plurality of panels (not show) that are welded together in a conventional manner. The door 20 (the closure panel) is movably coupled relative to the surface 17 for movement between the open position exposing the surface 17.

Similarly, the rear sill structure 40 includes a plurality of members (not shown) that are welded or otherwise rigidly fixed to one another in a conventional manner. The rear hatch door 46 is pivotally attached to a rear roof structure of the vehicle body structure 12 for movement between a closed position (FIGS. 1 and 2) and an open position (FIG. 3). The rear hatch door 46 is another example of a closure member of the vehicle 10 that moves between open and closed positions.

The lighting fixture 16 is attached to the surface 17 of the sill structure 30 and the lighting fixture 16 is attached to the surface of the rear sill structure 40 by any of a variety of attachment structures such as removable threaded fasteners (not show), snap-fitting fasteners (not shown), or other similar mechanical fastening systems. The lighting fixtures 16 can also be installed to their respective surfaces by heat activated and heat releasable adhesive materials.

As indicated in FIG. 3, an interior surface of the rear hatch door 46 can be provided with one of the plurality of lighting fixtures 16.

Figure 4:
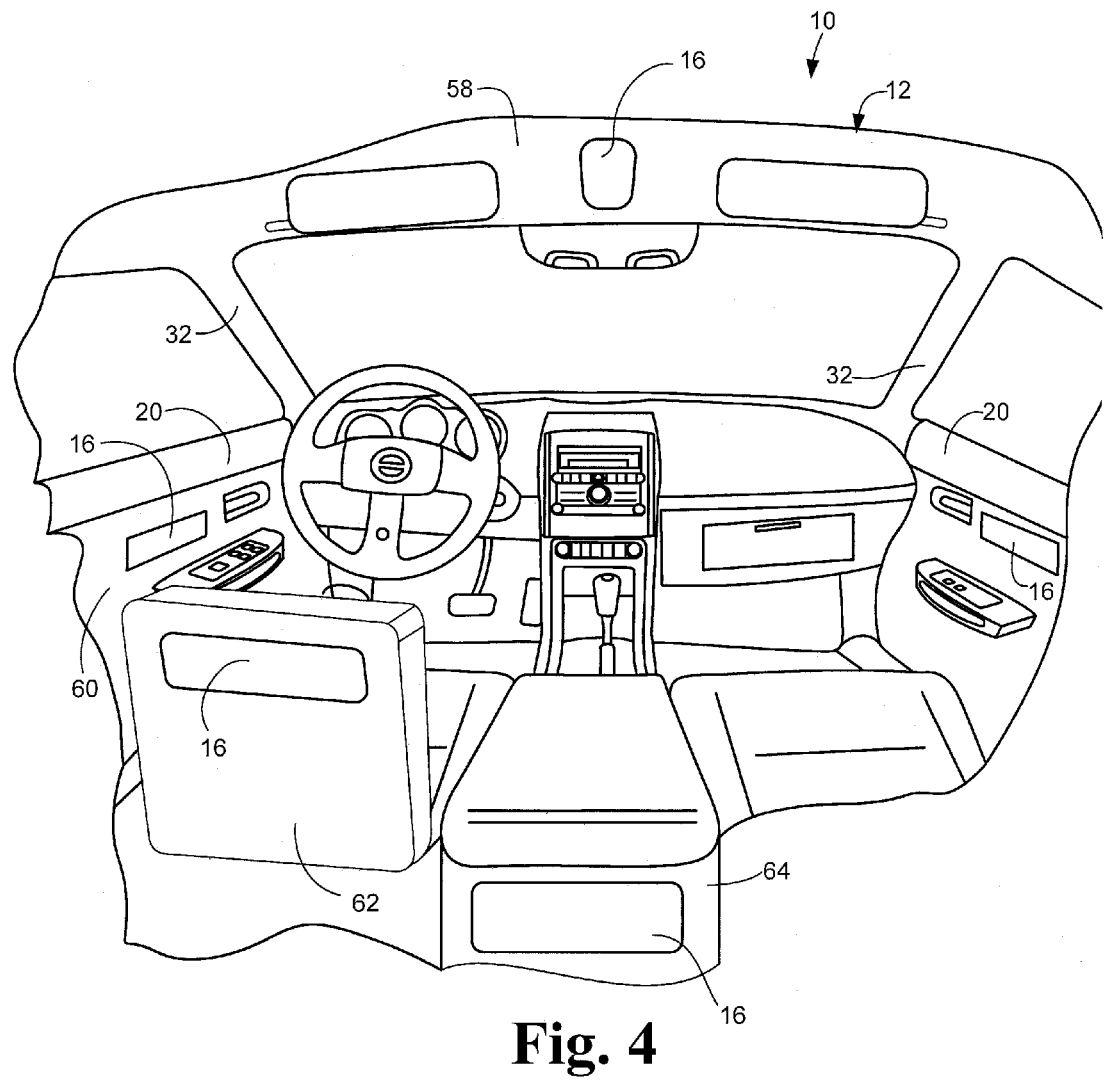
FIG. 4 is a perspective view of the passenger compartment of the vehicle showing still further examples of the plurality of lighting fixtures in accordance with the first embodiment.

FIG. 4 shows various surfaces of components within the passenger compartment 24, such as a headliner 58 an interior surface 60 of the door 20, a rear surface of one of the seats 62 and a rear surface of a center console 64. Each of the headliner 58, the interior surface 60 of the door 20, the rear surface of one of the seats 62 and the rear surface of the center console 64 is provided with one of the lighting fixtures 16. It should be understood from the drawings and the description herein, that the various locations where one of the plurality of light fixtures 16 can be installed can vary from vehicle to vehicle. For example, the vehicle can optionally include only two of the plurality of light fixtures, one on the headliner and one on the surface 60 of the door 20. However, any of a variety and any of a combination of locations can be provided with one or more of the plurality of lighting fixtures 16.

Figure 5:
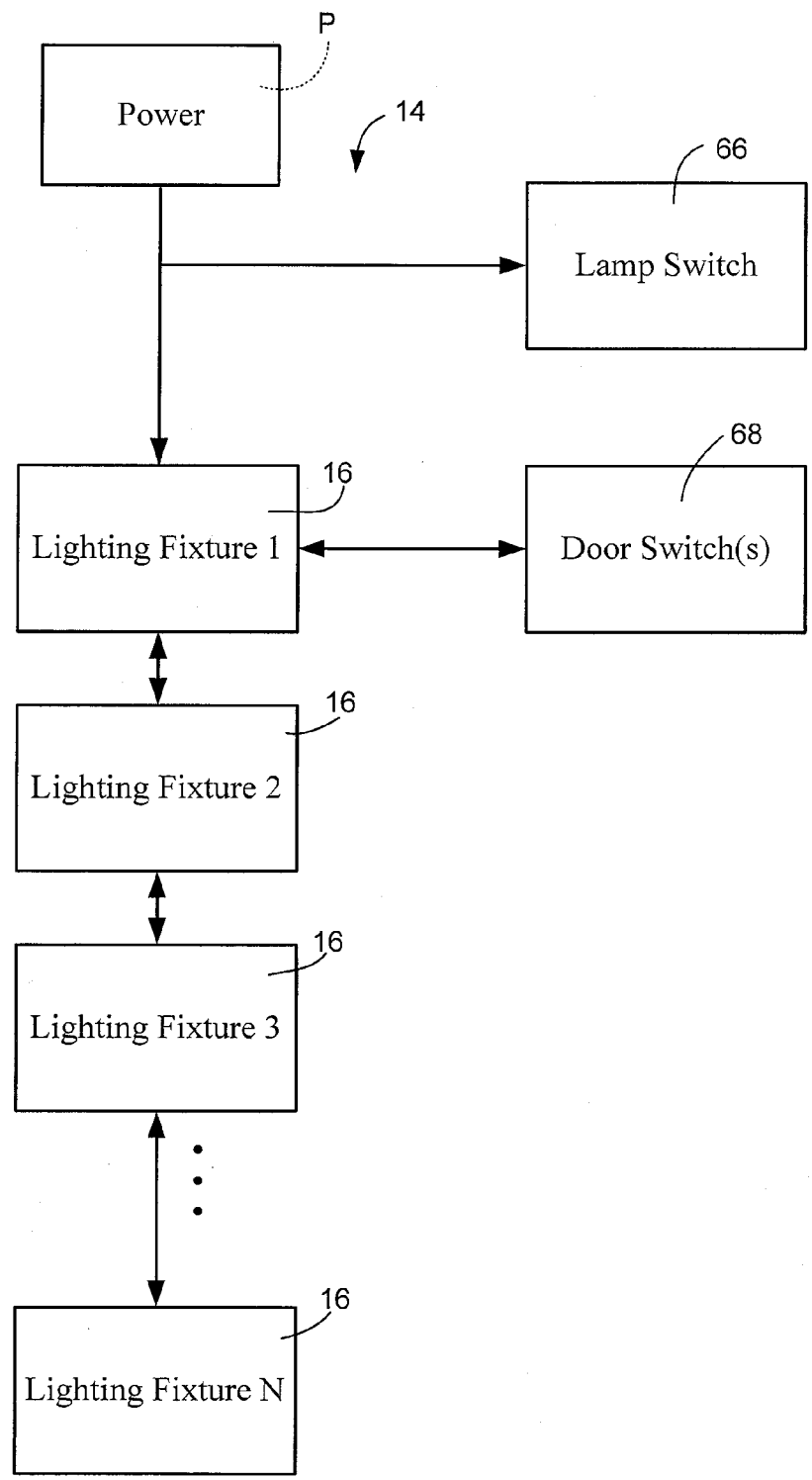
FIG. 5 is a schematic view of the illumination system showing the plurality of lighting fixtures connected to one another and to a lamp switch on the instrument panel and door switches in accordance with the first embodiment.

FIG. 5 is a schematic view showing a plurality of the lighting fixtures 16 electronically connected to one another within the vehicle 10, and further being electronically connected to a lamp switch 66, a door switch 68 and a power source P, such as a battery. The lamp switch 66 is installed to, for example, the instrument panel within the passenger compartment 24, for master on/off control of the illumination assembly 14. More specifically, a driver or passenger within the vehicle 10 can operate the lamp switch 66 and turn on or off all of those of the lighting fixtures 16 that are linked to one another, as described in greater detail below. Further, the door switch 68 is located along, for example, the A-pillar 32. When the door switch 68 detects that the door 20 is open (not closed), the door switch 68 activates the illumination assembly 14. More specifically, when one of the doors of the vehicle 10 is open the illumination assembly 14 is turned on. When all of the doors of the vehicle 10 are closed, the illumination assembly 14 is turned off.

Figure 6:
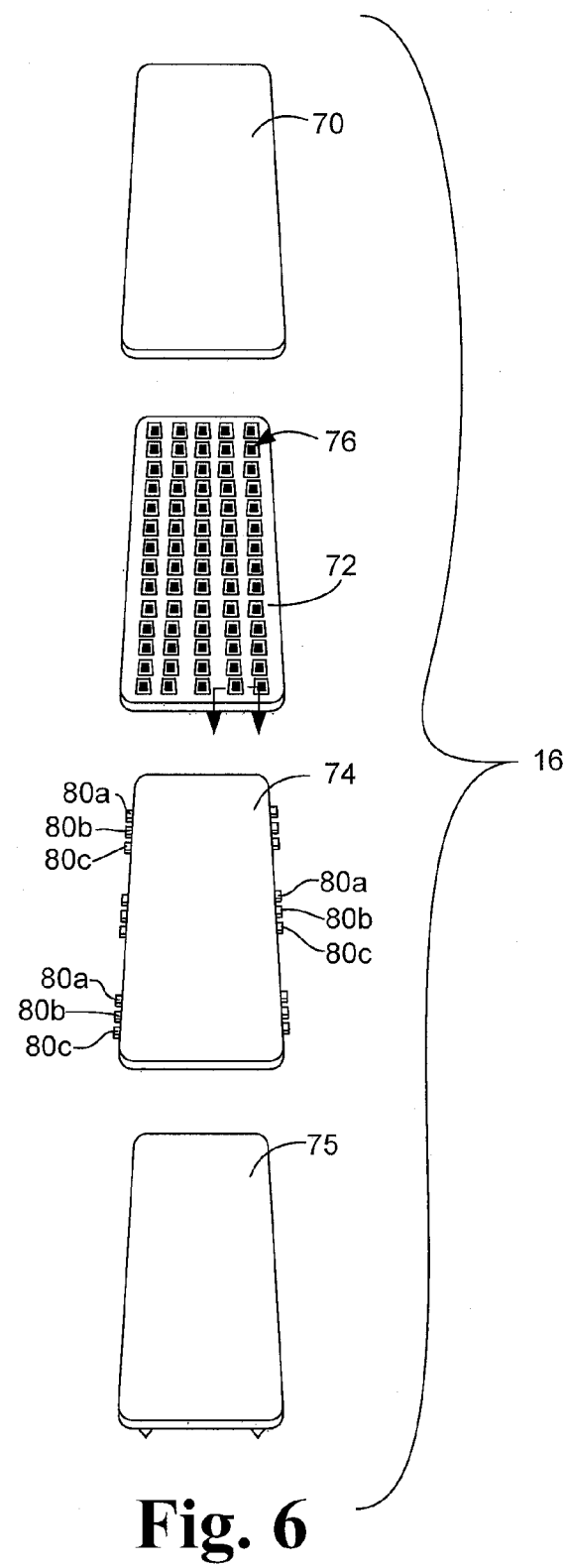
FIG. 6 is a schematic exploded view of one of the lighting fixtures in accordance with the first embodiment.

A description of one of the plurality of lighting fixtures 16 is now provided with specific reference to FIG. 6. The lighting fixtures 16 are all operably and structurally similar or the same and therefore all include the same basic elements. The lighting fixtures 16 can be manufactured with a variety of differing shapes and contours, depending upon where each particular lighting fixture 16 is installed within the vehicle 10. For example, the lighting fixture 16 shown in FIG. 2 has an elongated rectangular shape. The lighting fixture 16 on the rear surface of the seat 62 has a slightly less elongated rectangular shape. However, the lighting fixtures 16 are electronically and operably the same, regardless of the shapes, contours and sizes. Therefore, description of one of the light fixtures 16 applies to all of the light fixtures 16.

Figure 7:
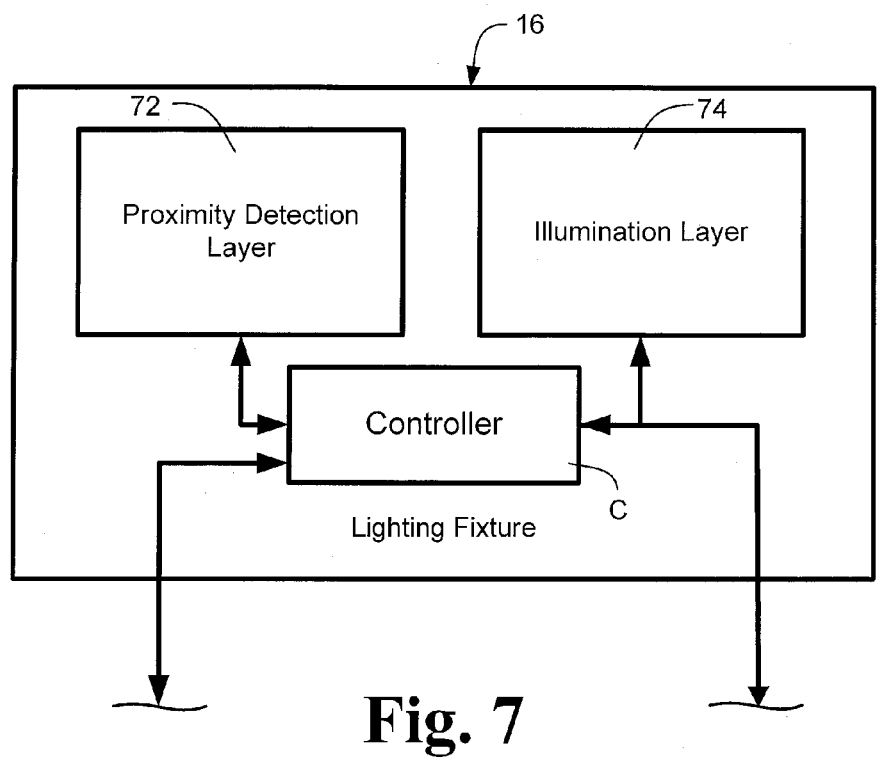
FIG. 7 is a block diagram schematically showing basic operating components of the lighting fixture in accordance with the first embodiment.

As shown schematically in FIG. 6, the lighting fixture 16 basically includes at least a protective transparent cover 70, a touch sensitive layer 72, an illumination layer 74 and a base portion 75. The lighting fixture 16 is also shown schematically in a block diagram in FIG. 7 and further includes a controller C that is electrically connected to or coupled to the touch sensitive layer 72 and the illumination layer 74.

The protective transparent cover 70 is preferably made of a transparent material such as plastic or glass. The base portion 75 is a supporting layer that provides strength and rigidity to the lighting fixture 16.

The touch sensitive layer 72 can comprise any of a variety of touch sensing technologies. For example, the touch sensitive layer 72 can detect the presence and movement of a finger F using reflected light, heat detection or other similar proximity detection technology.

In one depicted embodiment, the touch sensitive layer 72 is a layer or layers of electrically conductive material(s) printed or otherwise provided on the underside of the protective transparent cover 70. For example, the touch sensitive layer 72 can be printed using known printing techniques or a conductive layer of material can be applied to the underside of the protective transparent cover 70 and unnecessary areas etched or otherwise removed from the protective transparent cover 70 to form the touch sensitive layer 72.

The touch sensitive layer 72 includes, for example, an array 76 of proximity switches 76a. The array 76 includes a plurality of small proximity switches 76a that work in concert via continuous monitoring by the controller C, in the detection of one or more fingers F and the movement of the finger or fingers F along the surface of the lighting fixture 16.

Figure 8:
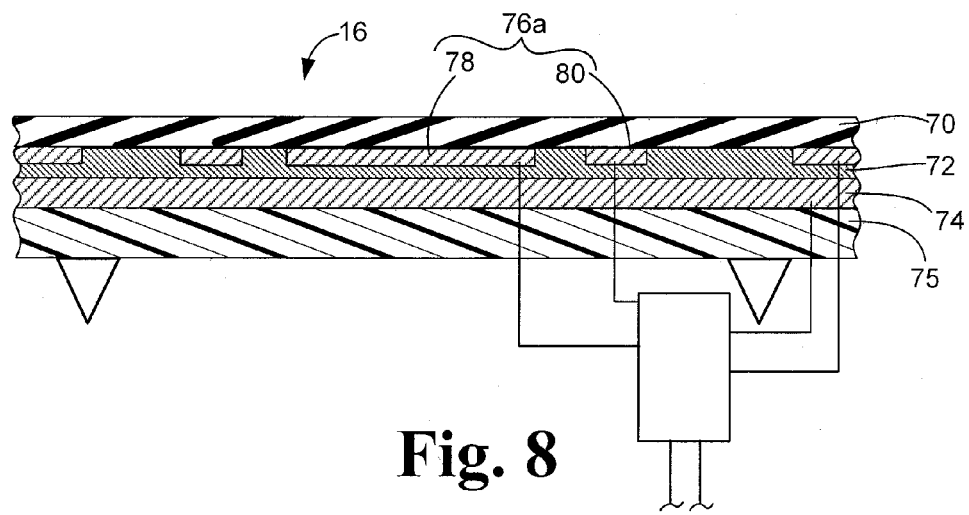
FIG. 8 is a cross-sectional view of a portion of the lighting fixture showing details of a single proximity switch among a plurality of proximity switches in accordance with the first embodiment.
Figure 9:
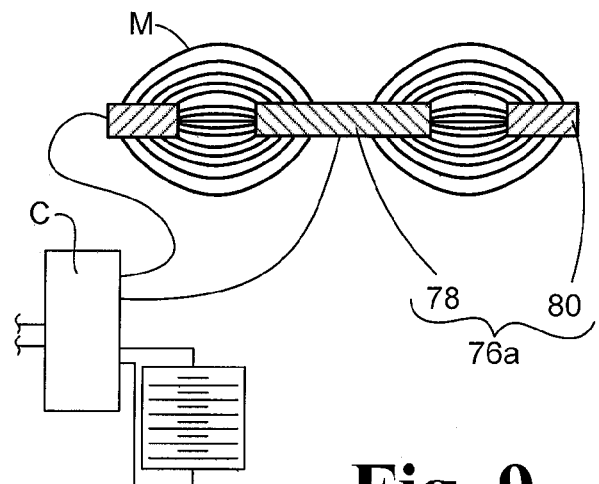
FIG. 9 is a schematic view of one of the proximity switches of the lighting fixture generating a magnetic field in accordance with the first embodiment.
Figure 10:
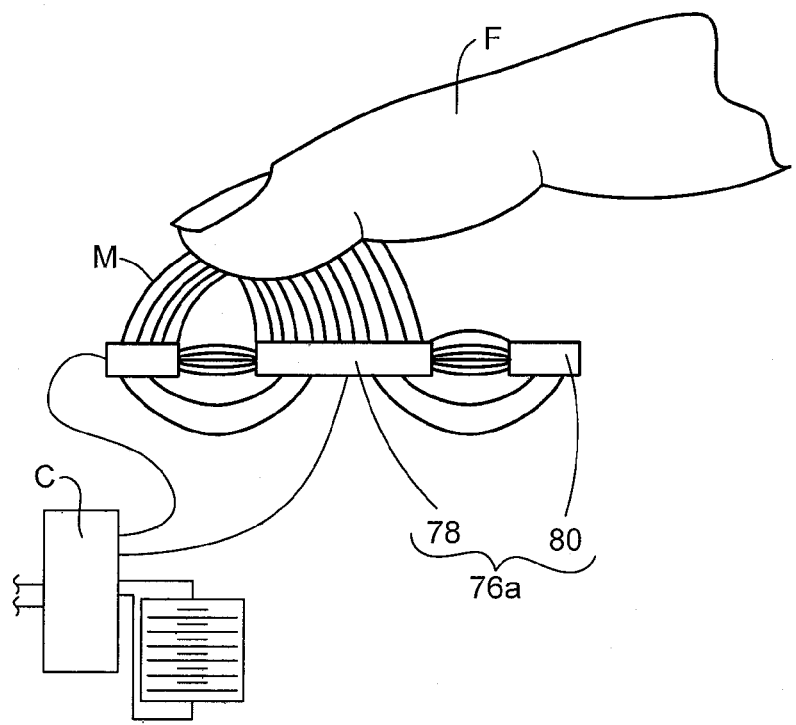
FIG. 10 is another schematic view of the one of the proximity switches of the lighting fixture showing a finger causing a disturbance in the magnetic field in accordance with the first embodiment.

FIGS. 8, 9 and 10 show one of the small proximity switches 76a that make up the array 76 of proximity switches. Each of the proximity switches 76a of the array 76 of proximity switches 76a includes a first electrically conductive switch portion 78 and a second electrically conductive switch portion 80. Both the first electrically conductive switch portion 78 and the second electrically conductive switch portion 80 are translucent. The first electrically conductive switch portions 78 in the array 76 of proximity switches 76a are electrically separated and spaced apart from the second electrically conductive switch portions 80.

As mentioned above, the first and second electrically conductive switch portions 78 and 80 can be printed directly to the underside of the protective transparent cover 70 at the same time. However, it should be understood from the drawings and the description herein that the first electrically conductive switch portions 78 can be printed separately from the second electrically conductive switch portions 80. Further, the first electrically conductive switch portions 78 can be coated with an electrically insulating coating prior to printing of the second electrically conductive switch portions 80 to ensure electrical separation thereof. Likewise, the second electrically conductive switch portions 80 can be coated with an electrically insulating coating prior to printing of the first electrically conductive switch portions 78 to ensure electrical separation therefrom.

Each of the proximity switches 76a of the array of proximity switches 76 operates in generally the same manner. Therefore description below of one proximity switch 76a applies to all the proximity switches 76a within the array 76 of proximity switches.

A single one of the first and second electrically conductive switch portions 78 and 80 is shown diagrammatically in each of FIGS. 8, 9 and 10 to demonstrate the operation of the proximity switch 76a and each of the proximity switches 76a.

As indicated in FIG. 6, for each of the proximity switches 76a, the second switch portion 80 surrounds the first switch portion 78 but is spaced apart therefrom. The proximity switches 76a in FIG. 6 are depicted with a generally square or rectangular shape. It should be understood that each proximity switch 76a can alternatively have a circular shape. Further, the proximity switches 76a are formed by rows of side-by-side elongated conductive strips that are electrically separated and spaced apart from one another.

The first and second electrically conductive switch portions 78 and 80 are connected to the controller C by power lines. The controller C is supplied with DC electricity from, for instance, a battery within the vehicle 10. The controller C includes conventional circuitry (not shown) that converts the DC electricity to AC electricity.

The array of proximity switches 76 defines a touch-sensitive surface that can detect the presence of the finger F or of multiple fingers F and the movement of the finger or fingers F. More specifically, the array 76 of proximity switches 76s and the controller C are configured to detect and distinguish between gestures among a plurality of differing movement gestures, as is described in greater detail below.

The proximity switches 76 operate as follows. When activated by a supply of AC power from the controller C, the electric potential between the second switch portion 80 and the first switch portion 78 creates a magnetic field M indicated in FIG. 9. The controller C includes conventional attenuated circuitry and/or programming that provides the controller C with the ability to detect fluctuations in the magnetic field M at each of the small proximity switches 76a resulting from proximity or touch of a human finger or fingers F, as indicated in FIG. 10. Once the controller C detects a disturbance or disturbances in the magnetic fields M, such as that depicted in FIG. 10, the controller C recognizes that disturbance and processes it and all other disturbances to determine which one of a plurality of possible movements or gestures have been made by the finger or fingers F.

The controller C is configured to sense magnetic field perturbations in each and every one of the proximity switches 76a, or any group of the proximity switches 76a of the array of proximity switches 76. Consequently, a driver or passenger of the vehicle 10 can touch any one of the lighting fixtures 16 or bring their finger F in close proximity to the lighting fixture 16 being operated and cause the lighting fixture 16 to respond accordingly. For example, the controller C can detect any of a plurality of differing actions and/or movement gestures along the surface of lighting fixture 16 using the movements detected relative to the touch sensitive layer 72, to turn on/off or change lighting parameters of the lighting fixture 16 and/or all linked ones of the lighting fixtures 16 via the illumination layer 74, as is described in greater detail below.

The illumination layer 74 is preferably a translucent layer that includes a plurality of light emitting optical devices or LEDs 80a, 80b and 80c, installed along edges of the illumination layer 74, as indicated in FIG. 6. The LEDs 80a can all be, for example, light emitting devices that emit a first color, such as blue light. The LEDs 80b can be, for example, light emitting devices that emit a second color, such as red light. The LEDs 80c can be, for example, light emitting devices that emit a third color, such as yellow light or green light.

However, it should be understood from the drawings and the description herein, that any number of differing colored light sources (LEDs) can be included with the illumination layer 74. In the depicted embodiment, three differing colors are included, but four, five, six or seven differing colored LEDs can be included, in order to provide customizable lighting within the passenger compartment 24 of the vehicle 10. Other colored LEDs can include violet, purple, pink and/or white, in addition to the blue, red and yellow or green LEDs mentioned above with respect to the illumination layer 74.

In effect, the touch sensitive layer 72 of the lighting fixture 16 serves as a touch-sensitive device operable along the exposed surface of the lighting fixture 16 to control the lighting fixture 16.

Figure 11:
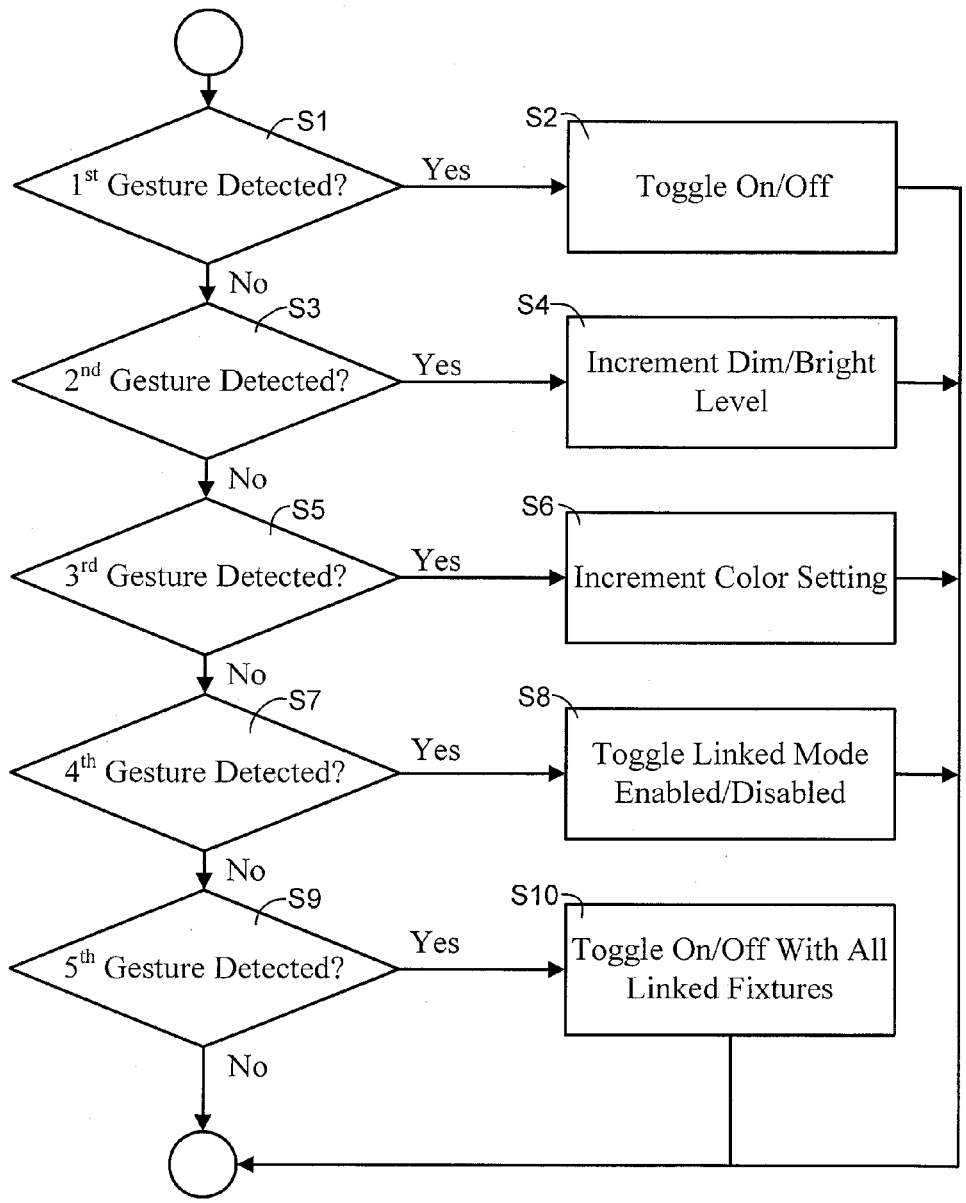
FIG. 11 is a flowchart showing basic steps of operation of each lighting fixture in accordance with the first embodiment.
Figure 12:
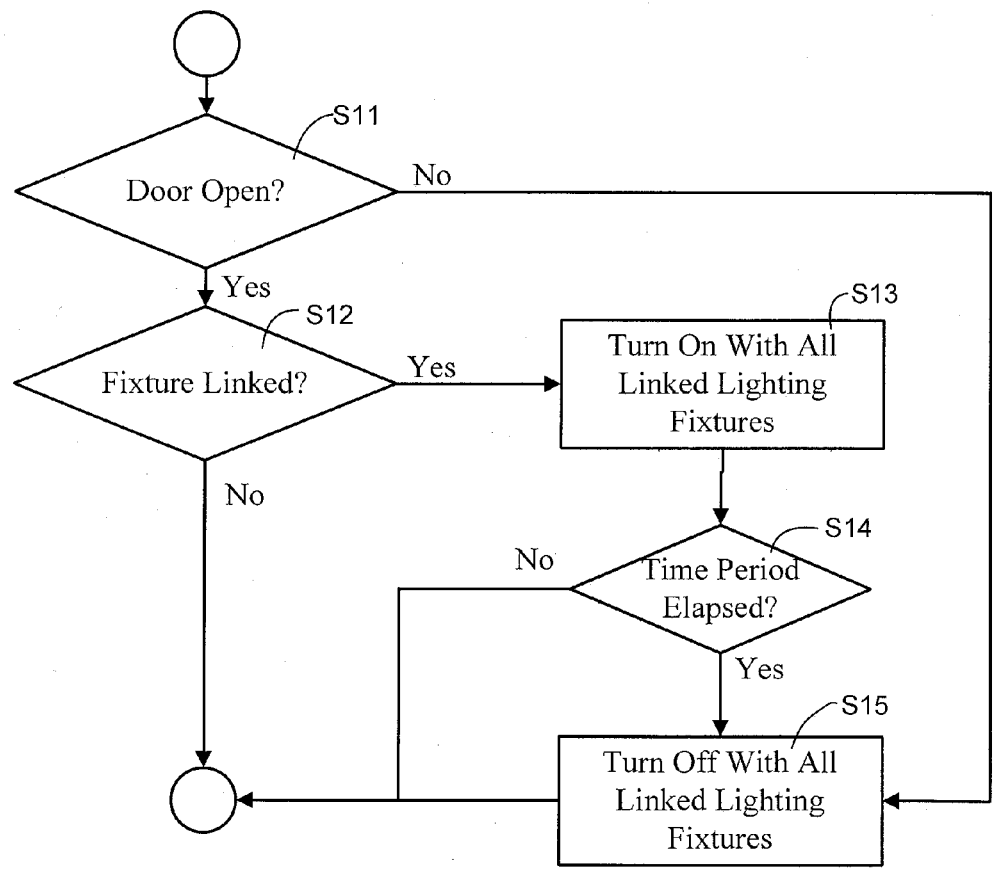
FIG. 12 is a flowchart showing basic steps for turning linked ones of the plurality of lighting fixtures on and off in accordance with the first embodiment.

A description of the controller C is now provided with specific reference to FIGS. 11-12. The controller C is electronically and operably connected to the touch sensitive layer 72 (a proximity detection layer) and the illumination layer 74. The controller C is configured to control various features of the lighting fixture 16. Specifically, each of the lighting fixtures 16 can be turned on and off; dim or brighten the light outputted; change the outputted light color; and link/unlink a particular one of the light fixtures 16 from one or more other linked light fixtures 16 among the plurality of light fixtures 16. The controller C is also configured to turn on/off all of those lighting fixtures 16 that are linked together at a given time.

Specifically, the controller C is configured to toggle the illumination layer 74 on and off in response to detecting a first movement gesture at the touch sensitive layer 72 (a proximity detection layer). The controller C is also configured to adjust a first prescribed lighting parameter of the light produced by the illumination layer 74 in response to detecting a second movement gesture at the proximity detection layer. In the depicted embodiment, the first prescribed lighting parameter is, for example, adjustment of the brightness of the light emitted by the illumination layer 74. Specifically the controller C can brighten or dim the outputted light. Alternatively, the first prescribed lighting parameter is, for example, changing of the color of the light emitted by the illumination layer 74.

The controller C is configured to monitor all movements of a person's finger or fingers F when that finger F or fingers F are touching the lighting fixture. More specifically, the controller C receives signals from each of the plurality of proximity switches 76a and determines whether or not a finger F or fingers F are in proximity thereto and whether or not the finger F or fingers F are moving. The controller C is further configured to distinguish between gestures among a plurality of movement gestures that are described in greater detail below.

As shown in FIG. 11 at step S1, the controller C determines whether or not a first movement gesture has been made along the surface of the lighting fixture 16. If the first movement gesture has been detected, operation moves to step S2 where the lighting fixture 16 is toggled between an on state and an off state (the lighting fixture 16 is turned on, if it is currently off, and turned off if it is currently on).

As step S3, the controller C determines whether or not a second movement gesture has been made along the surface of the lighting fixture 16. If the second movement gesture has been detected, operation moves to step S4 where level of light outputted by the lighting fixture 16 is brightened or dimmed. In other words, the lighting fixture 16 is incrementally dimmed if it is in its brightest output mode, or is made brighter if it is currently in its dimmest mode. The controller C incrementally continues increasing the brightness each time the second movement gesture is detected, until the brightest setting is achieved. Thereafter, each time the second movement gesture is detected, the controller C decreases the brightness until the dimmest setting is achieved. Alternatively, the controller C can cycle from the brightest setting back to the dimmest setting before continuing to increase the brightness upon subsequent detections of the second movement gesture.

As step S5, the controller C determines whether or not a third movement gesture has been made along the surface of the lighting fixture 16. If the third movement gesture has been detected, operation moves to step S6 where color of light outputted by the lighting fixture 16 is changed. If the lighting fixture 16 is provided with three different color settings, the controller C incrementally cycles from one color to the next each time the third movement gesture is detected.

As step S7, the controller C determines whether or not a fourth movement gesture has been made along the surface of the lighting fixture 16. If the fourth movement gesture has been detected, operation moves to step S8 where the lighting fixture 16 toggled between a linked mode and an unlinked mode. Specifically, in the linked mode, the lighting fixture 16 is turned on and off with all other linked ones of the lighting fixtures 16 in response to operation of the lamp switch 66 or operation of the door switch 68.

As step S9, the controller C determines whether or not a fifth movement gesture has been made along the surface of the lighting fixture 16. If the fifth movement gesture has been detected, operation moves to step S10 where all of the light fixtures 16 that are currently set to the linked mode are toggled between the on state and the off state. Specifically, if all of the linked ones of the lighting fixtures 16 are currently in the on state, then in response to detection of the fifth movement gestures, all of the linked ones of the lighting fixtures 16 are turned off. If all of the linked ones of the lighting fixtures 16 are currently in the off state, then in response to detection of the fifth movement gestures all of the linked ones of the lighting fixtures 16 are turned on. Steps S9 and 10 differ from steps S1 and S2 in that, in steps S1 and S2 only a current one of the lighting fixtures 16 being touched is toggled on or off. In steps S9 and S10, all linked ones of the lighting fixtures 16 are toggled on or off. Hence, each of the lighting fixtures 16 can be operated independently of the other lighting fixtures 16 (steps S1 and S2) or can be operated in concert or in unison with all linked ones of the lighting fixtures 16.

As shown in FIG. 12, at step S11, the controller C detects whether or not the door 20 (or any of the doors of the vehicle or the rear hatch door 46) is open. If the door is not open or was recently shut, all linked ones of the lighting fixtures 16 are turned off at step S15. However, if one of the lighting fixtures 16 has been manually turned on, via steps S1 and S2, then that single lighting fixture 16 can remain on.

At step S11, if the controller C determines that one of the doors or the rear hatch door 46 has been opened, operation moves to step S12. At step S12, the controller C determines whether or not the lighting fixture 16 is linked to other lighting fixtures 16 that are currently in the linked mode. If the lighting fixture 16 is linked to the other linked lighting fixtures 16, then operation moves to step S13. At step S13, all linked ones of the lighting fixtures 16 are turned on. Operation then moves to step S14. At step S14, the controller C determines whether or not a predetermined time period as elapsed. The predetermined time period can be anywhere from thirty seconds to five minutes. For example, the predetermined time period can be one minute, two minutes or three minutes. The predetermined time period helps to prevent the lighting fixtures 16 from being left on for prolonged periods of time, thereby increasing the risk of excessive battery drain.

At step S14, if the predetermined time period has elapsed, the linked ones of the lighting fixtures 16 are turned off at step S15. If the predetermined time period has not elapsed, the linked ones of the lighting fixtures 16 remain on, as the steps in FIGS. 11 and 12 are repeated.

The movement gestures detected by the touch sensitive layer 72 and recognized by the controller C include any of a variety of movement gestures. FIG. 13 through FIG. 17 show some examples of movement gestures employed by the illumination assembly 14.

Figure 13:
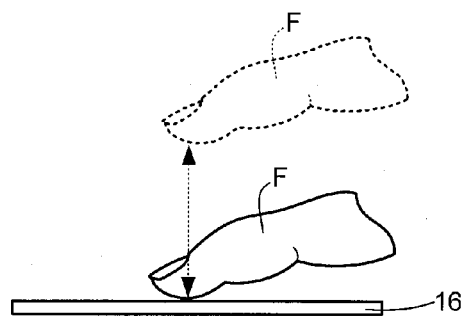
FIGS. 13 through 17 are schematic representations of a plurality of movement gestures used to control operation of each of the lighting fixtures.

For example, FIG. 13 represents a first movement gesture that includes a single contact between the finger F and the lighting fixture 16. Preferably, the contact is quick and pulse-like. More specifically, the controller C is configured to detect a single contact with a finger within a first predetermined time period. For example, the single contact must include, the finger F touching and then moving away from the lighting fixture within a predetermined period of time that is, for example, one or two seconds. In other words, the finger F merely touches the lighting fixture 16 before quickly moving away. The controller C detects that this is one of the movement gestures. Typically, the controller C is programmed and/or configured such that the single contact defines the first movement gesture (steps S1 and S2 in FIG. 11) because toggling the lighting fixture 16 on and off is likely to be the most extensively used movement gesture.

FIG. 13 also represents another movement gesture, where the finger F quickly contacts the lighting fixture 16 twice within the predetermined time period of, for example one or two seconds. In other words, the finger F moves into contact with the lighting fixture F, then moves away quickly, immediately makes contact a second time with the lighting fixture F and then moves quickly away, all within the predetermined time period. The controller C detects that this is another one of the movement gestures. The controller C can be programmed and/or configured such that the finger contacting twice quickly defines the second movement gesture (steps S3 and S4 in FIG. 11), where the controller C increments or decrements the brightness setting of the illumination layer 74.

Figure 14:
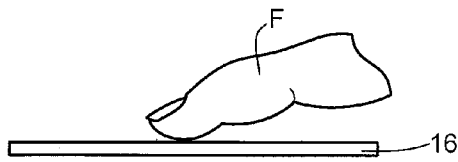

FIG. 14 represents another movement gesture, where the finger F contacts the lighting fixture 16 and remains in contact with the lighting fixture F for a period of time that is longer than the predetermined time period of one to two seconds. More specifically, this movement gesture includes the controller detecting a single contact with the finger F, but for at least a second predetermined time period greater than the first predetermined time period. The second predetermined time period can be three or four seconds. Once the controller C determines that this prolonged contact with the finger F has occurred, the controller C makes the appropriate change in the operation of the lighting fixture F. For example, this movement gesture can correspond to the third movement gesture described above with respect to steps S5 and S6, where the color of light produced by the lighting fixture 16 is changed.

Figure 15:
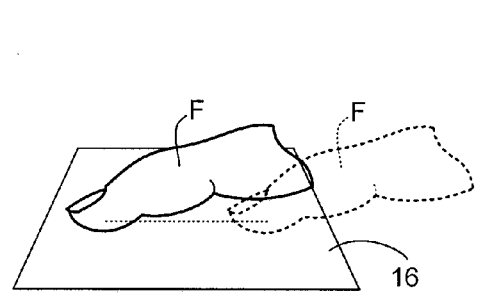

FIG. 15 represents yet another movement gesture, where the finger F contacts the lighting fixture 16 and moves along the surface of the lighting fixture 16 in an approximately straight line. When the controller C detects this linear movement, the controller C can equate this with, for example, the fourth movement gesture corresponding to steps S7 and S8 in the flowchart depicted in FIG. 11. Hence, upon detection of this linear movement of one finger F, the controller C toggles the lighting fixture 16 between the linked mode and the unlinked mode.

Figure 16:
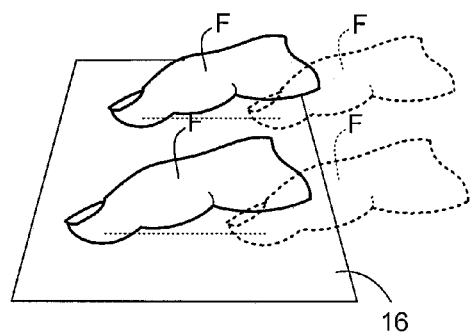

FIG. 16 represents still another movement gesture, where two of the fingers F contact the lighting fixture 16 and move along the surface of the lighting fixture 16 in approximately straight lines. When the controller C detects this dual linear movement, the controller C can equate this with, for example, the fifth movement gesture corresponding to steps S9 and S10 in the flowchart depicted in FIG. 11. Hence, upon detection of this dual linear movement of two fingers F, the controller C can toggles all linked ones of the lighting fixtures 16 between an on state and an off state (toggles them on and off).

Figure 17:
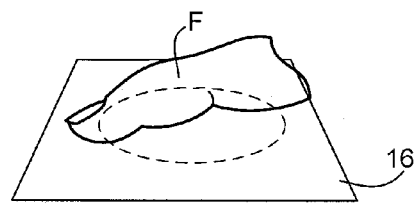

FIG. 17 represents another movement gesture, where the finger F contacts the lighting fixture 16 and makes a circular movement along the surface of the lighting fixture 16. When the controller C detects this circular movement, the controller C can equate this with, for example, the sixth movement gesture corresponding to an unspecified operation. Alternatively, the controller C can be programmed such that any of the above described movement gestures can be programmed to be any one of the first through fifth movement gestures described with respect to the operations depicted in FIG. 11. In other words, the operations of the controller C can be programmed with any of a differing combination of the movement gestures described above.

More specifically, the first movement gesture can be defined as the single contact of the finger F with the lighting fixture 16, the double contact, the linear contact, dual linear contact or circular contact. Similarly, the second movement gesture can be defined as any one of the above described contacts with the finger F.

The controller C in each of the lighting fixtures 16 can be a single controller C connected to each of the lighting fixtures 16 or alternatively can be a plurality of controllers C that communicate with one another, with one controller C being included in each one of the lighting fixtures 16.

The controller C preferably includes a microcomputer with a lighting fixture control program that controls the lighting fixtures 16, as discussed below. The controller 16 can also include other conventional components such as an input interface circuit, an output interface circuit, and storage devices such as a ROM (Read Only Memory) device and a RAM (Random Access Memory) device. The memory circuit of the controller C stores processing results and control programs such as ones for lighting control operation that are run by the processor circuit. The controller C is operatively coupled to the lighting fixture 16 in a conventional manner. The internal RAM of the controller C stores statuses of operational flags and various control data. The internal ROM of the controller C stores various operations of the lighting fixtures 16. It will be apparent to those skilled in the art from this disclosure that the precise structure and algorithms for the controller C can be any combination of hardware and software that will carry out the functions of the present invention.

The non-lighting components of the vehicle 10 are conventional components that are well known in the art. Since these non-lighting-related components are well known in the art, these structures will not be discussed or illustrated in detail herein. Rather, it will be apparent to those skilled in the art from this disclosure that the components can be any type of structure and/or programming that can be used to carry out the present invention.

General Interpretation of Terms

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiment, the following directional terms "forward", "rearward", "above", "downward", "vertical", "horizontal", "below" and "transverse" as well as any other similar directional terms refer to those directions of a vehicle equipped with the illumination assembly. Accordingly, these terms, as utilized to describe the present invention should be interpreted relative to a vehicle equipped with the illumination assembly.

The term "detect" as used herein to describe an operation or function carried out by a component, a section, a device or the like includes a component, a section, a device or the like that does not require physical detection, but rather includes determining, measuring, modeling, predicting or computing or the like to carry out the operation or function.

The term "configured" as used herein to describe a component, section or part of a device includes hardware and/or software that is constructed and/or programmed to carry out the desired function.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such features. Thus, the foregoing descriptions of the embodiments according to the present invention are provided for illustration only, and not for the purpose of limiting the invention as defined by the appended claims and their equivalents.

What is claimed is:

1. A vehicle interior illumination assembly, comprising:
a lighting fixture having a proximity detection layer and an illumination layer, with one of the proximity detection layer and the illumination layer overlaying the other of the proximity detection layer and the illumination layer; and
a controller operably connected to the proximity detection layer and the illumination layer, the controller being configured to toggle the illumination layer on and off in response to the controller detecting a first movement gesture at the proximity detection layer, the controller being configured to adjust a first prescribed lighting parameter of the light produced by the illumination layer in response to the controller detecting a second movement gesture at the proximity detection layer different from the first movement gesture, the first prescribed lighting parameter being changing of the color of light produced by the illumination layer, and the controller being configured to adjust a second prescribed lighting parameter in response to the controller detecting a third movement gesture at the proximity detection layer that is different from the first and second movement gestures, the second lighting parameter each being adjusting a level of brightness of light produced by the illumination layer.

2. The vehicle interior illumination assembly according to claim 1, wherein
the first movement gesture includes the controller detecting a single contact with a finger within a first predetermined time period.

3. The vehicle interior illumination assembly according to claim 2, wherein
the second movement gesture includes the controller detecting a plurality of contacts with the finger within the first predetermined time period.

4. The vehicle interior illumination assembly according to claim 2, wherein
the second movement gesture includes the controller detecting a single contact with the finger for at least a second predetermined time period greater than the first predetermined time period.

5. The vehicle interior illumination assembly according to claim 1, wherein
the lighting fixture is separately toggled on and off by a separately operable switch that is spaced apart from the lighting fixture.

6. The vehicle interior illumination assembly according to claim 1, wherein
the lighting fixture comprises a first lighting fixture having a first illumination layer and the proximity detection layer, and a second lighting fixture having a second illumination layer that is operated in concert with the first illumination layer.

7. The vehicle interior illumination assembly according to claim 1, wherein
the lighting fixture comprises a first lighting fixture having a first illumination layer and a first proximity detection layer, and a second lighting fixture having a second illumination layer and a second proximity detection layer that is operated independently of the first illumination layer, the first lighting fixture being spaced apart from the second lighting fixture.

8. The vehicle interior illumination assembly according to claim 1, wherein
the lighting fixture comprises a first lighting fixture having a first illumination layer and a first proximity detection layer, and a second lighting fixture having a second illumination layer and a second proximity detection layer, the first lighting fixture being spaced apart from the second lighting fixture, the controller being configured to operate the first and second illumination layers in unison in response to detecting a fourth movement gesture at one of the first proximity detection layer and the second proximity detection layer, and operate the first illumination layer independently from operation of the second illumination layer in response to detecting a fifth movement gesture at one of the first proximity detection layer and the second proximity detection layer.

9. The vehicle interior illumination assembly according to claim 1, wherein
the proximity detection layer comprises an array of proximity switches defining a touch-sensitive surface.

10. The vehicle interior illumination assembly according to claim 9, wherein
the first movement gesture includes the controller detecting a single contact with a finger within a first predetermined time period.

11. The vehicle interior illumination assembly according to claim 9, wherein
the second movement gesture includes the controller detecting a linear movement with a finger along the touch-sensitive surface.

12. The vehicle interior illumination assembly according to claim 9, wherein
the second movement gesture includes the controller detecting contact with and movement of two fingers along the touch-sensitive surface.

13. The vehicle interior illumination assembly according to claim 12, wherein
the second movement gesture further includes the controller detecting simultaneous linear movement of the two fingers along the touch-sensitive surface.

14. The vehicle interior illumination assembly according to claim 9, wherein
the second movement gesture includes the controller detecting movement of a finger along the touch-sensitive surface in a circular pattern.

15. A vehicle interior illumination assembly, comprising:
a lighting fixture having a proximity detection layer and an illumination layer, with one of the proximity detection layer and the illumination layer overlaying the other of the proximity detection layer and the illumination layer; and
a controller operably connected to the proximity detection layer and the illumination layer, the controller being configured to toggle the illumination layer on and off in response to the controller detecting a first movement gesture at the proximity detection layer, the controller being configured to adjust a first prescribed lighting parameter of the light produced by the illumination layer in response to the controller detecting a second movement gesture at the proximity detection layer, and the controller being configured to adjust a second prescribed lighting parameter in response to the controller detecting a third movement gesture at the proximity detection layer, the first, second and third movement gestures each being different from one another and each being selected from a group of movement gestures consisting of: pulse-like contact between a finger and the lighting fixture along the proximity detection layer, contact between a finger and the lighting fixture along the proximity detection layer for at least a predetermined first period of time, contact between a finger and the lighting fixture along the proximity detection layer for a predetermined second period of time that is longer than the first period of time, contact between a finger and the lighting fixture with linear movement of the finger along the proximity detection layer, contact between two fingers and the lighting fixture with parallel movements of the two fingers along the proximity detection layer, and contact between a finger and the lighting fixture with circular movement of the finger along the proximity detection layer.

16. The vehicle interior illumination assembly according to claim 15, wherein
one of the first, second and third prescribed lighting parameters include adjusting a level of brightness of light produced by the illumination layer in response to detecting the second movement gesture at the proximity detection layer.

17. The vehicle interior illumination assembly according to claim 15, wherein
one of the first, second and third prescribed lighting parameter include changing of the color of light produced by the illumination layer in response to detecting the second movement gesture at the proximity detection layer.

18. The vehicle interior illumination assembly according to claim 17, wherein
another of the first, second and third controller is configured to adjust a second prescribed lighting parameter that includes adjusting a level of brightness of light produced by the illumination layer in response to detecting a third movement gesture along the proximity detection layer.

19. The vehicle interior illumination assembly according to claim 17, wherein
the illumination layer is configured to selectively emit at least two different colors.

20. A vehicle interior illumination assembly, comprising:
a first lighting fixture having a first proximity detection layer and a first illumination layer, with one of the first proximity detection layer and the first illumination layer overlaying the other of the first proximity detection layer and the first illumination layer, the first lighting fixture being installed within a vehicle at a first location;
a second lighting fixture having a second proximity detection layer and a second illumination layer, with one of the second proximity detection layer and the second illumination layer overlaying the other of the second proximity detection layer and the second illumination layer, the second lighting fixture being installed within a vehicle at a second location spaced apart from the first location; and
a controller operably connected to the first and second proximity detection layers and the first and second illumination layers, the controller being configured to toggle at least one of the first and second illumination layers on and off in response to the controller detecting a first movement gesture at one of the first and second proximity detection layers, the controller being configured to adjust a first prescribed lighting parameter of the light produced by at least one of the first and second illumination layers in response to the controller detecting a second movement gesture along at least one of the first and second proximity detection layers different from the first movement gesture, the first prescribed lighting parameter being the linking and unlinking of operation of the first lighting fixture to the operation of the second lighting fixture, and the controller being configured to adjust a second prescribed lighting parameter of the light produced by at least one of the first and second illumination layers in response to the controller detecting a third movement gesture along at least one of the first and second proximity detection layers different from the first and second movement gestures, the second prescribed lighting parameter being selected from one of the group of parameters in the group consisting of changing of the color of light produced by at least one of the first and second illumination layers, and adjusting a level of brightness of light produced by the illumination layer.

* * * * *